Feb. 4, 1958            J. W. DIXON            2,822,033
LATERAL SUPPORT FOR HUMANS ON FLAT VEHICLE SEATS
Filed Sept. 19, 1955            2 Sheets-Sheet 1
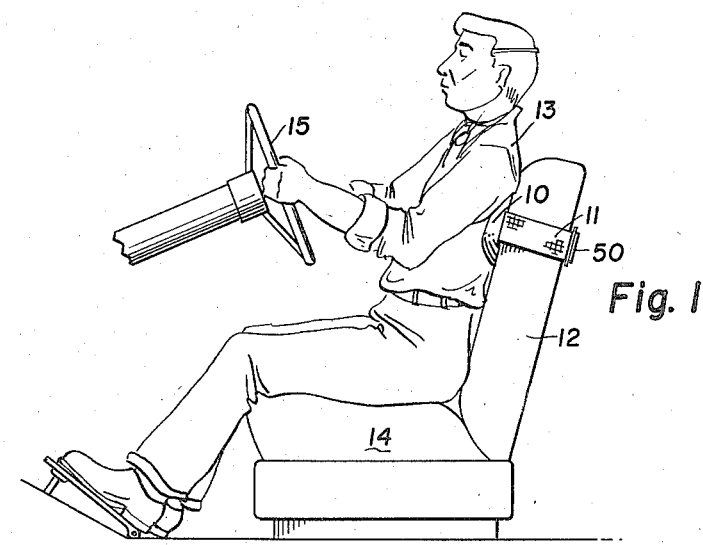
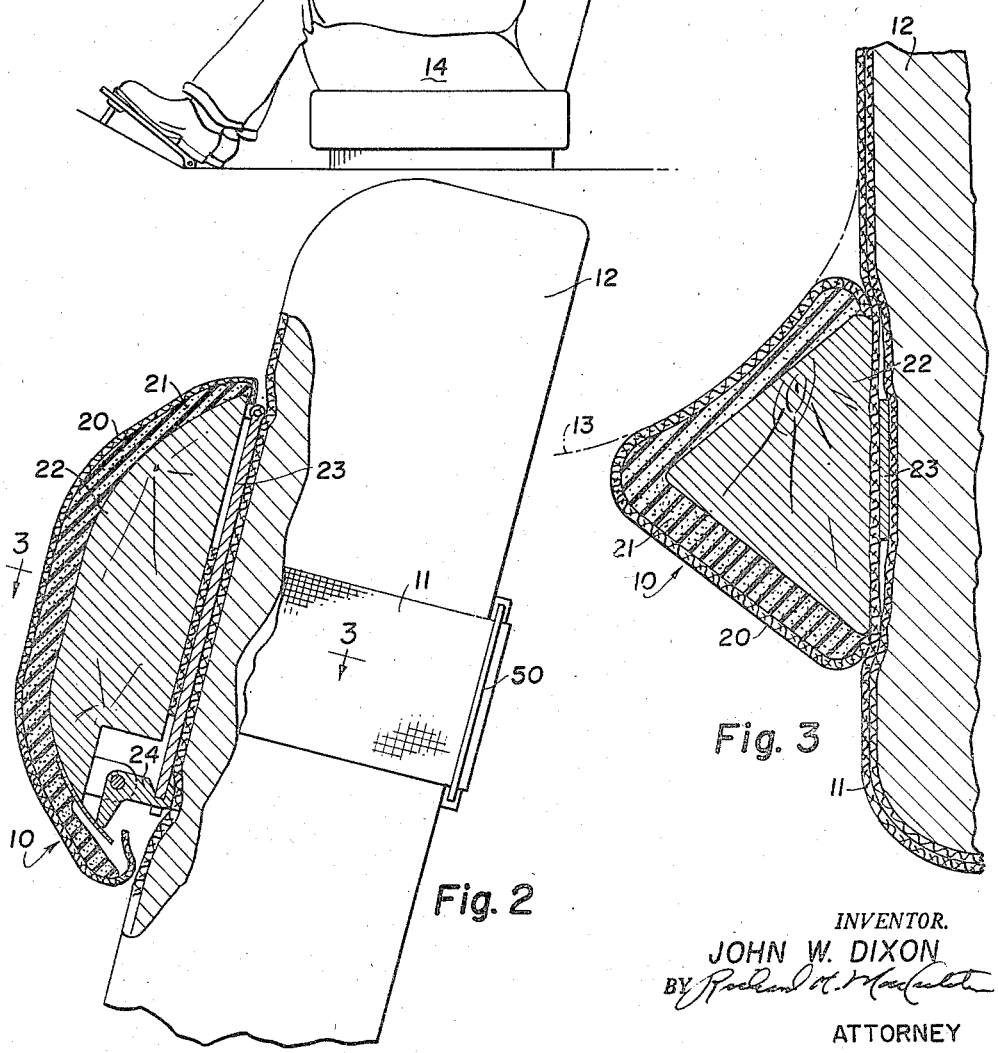
INVENTOR.
JOHN W. DIXON
BY
ATTORNEY Feb. 4, 1958          J. W. DIXON          2,822,033

LATERAL SUPPORT FOR HUMANS ON FLAT VEHICLE SEATS

Filed Sept. 19, 1955          2 Sheets-Sheet 2

*INVENTOR.*
JOHN W. DIXON
BY
ATTORNEY

United States Patent Office 2,822,033
Patented Feb. 4, 1958

2,822,033

LATERAL SUPPORT FOR HUMANS ON FLAT VEHICLE SEATS

John W. Dixon, Shaker Heights, Ohio

Application September 19, 1955, Serial No. 535,121

5 Claims. (Cl. 155—182)

This invention relates to lateral support means for the upper part of the body of a person driving or riding in an automobile or other vehicle, and has particular significance in connection with vehicles having wide flat seats such as those designed for an optional third passenger.

With long distance travel, lateral support of the upper torso is badly needed, by the driver because his arms and shoulders tire as he has to grip the wheel to overcome sidesway on curves and bumps—all of which reduces his control of the car and causes cumulative tension in the arms and throughout the body—and by passengers who tend to slide sideways or fall onto the next person—all of which is very tiring and dangerous.

It is an object of the present invention to provide simple and inexpensive means for overcoming the above mentioned difficulties.

Another object is to provide easily removable and adjustable lateral support means for a human torso with respect to a vehicle seat back.

Broadly, the means employed in the embodiments herein illustrated and described comprises a pair of solid back resilient pads each having means for its removal from or laterally adjustable connection to a web or strap means fastened with respect to the seat back. Preferably the pads have tapered frontwardly extending resilient surfaces so as to fit at the rear sides of the large of a human back just below the armpits and in back of the chest to give comfortable support as the weight is thrown against either pad.

Other objects and advantages will become apparent and the invention will be better understood from consideration of the following description taken in connection with the accompanying drawing, in which:

Fig. 1 is a side-elevational view showing a human body as seated in a vehicle on a seat having a seat back provided with lateral support pad means in accordance with the invention;

Fig. 2 is an enlarged view of a portion of the seat back of Fig. 1 and showing the lateral support pad in section;

Fig. 3 is a cross sectional view showing a portion of the support pad and associated seat back as viewed along the line 3—3 of Fig. 2;

Figure 4:
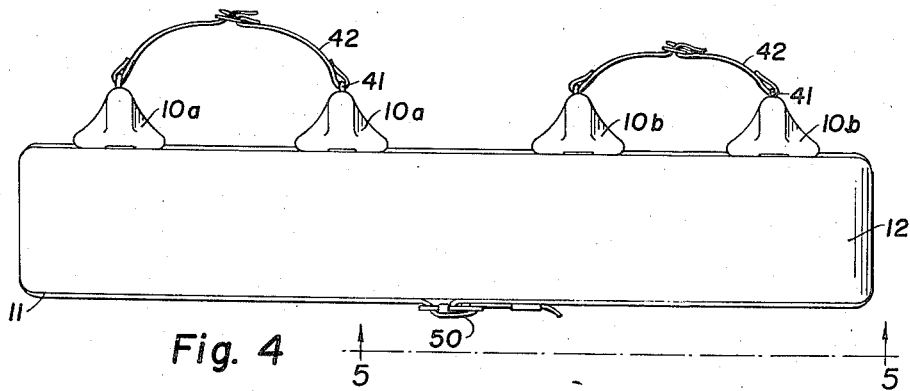
Fig. 4 is a plan view of a seat back and associated parts according to the invention but showing a modification in which safety seat belts are used in conjunction with the lateral support pads.

Heretofore back conforming adjustable supports for humans have been known but they have never been simple enough nor universal enough to acquire any great usage on automotive vehicle seat backs. In order to provide equipment inexpensive to make, easy to install and adjust, and easy to remove and store (as in the vehicle glove compartment), I provide for each vehicle occupant a pair of lateral support resilient pads such as the one shown at 10 in Fig. 1. For each such pad, means are provided (as hereafter described) for selectively removing it from or securing it to a strap or web 11 completely encircling or otherwise associated with a conventional seat back 12. Thus as a human being 13 sits upon an associated seat bottom 14, for example as a driver holding a steering wheel 15, he is supported by pad 10 (and its mate) preferably at the back sides just below the level of the arm pits so that he is protected against side sway and need not grasp the wheel so hard (or lose control of the vehicle) if he is the driver, or tire himself trying to otherwise support his upper torso if he is a passenger.

The internal construction of the resilient pad (10) with means for adjustably and removably fastening it to the strap means (11) may take many forms and as shown in Fig. 2 the pad has an outer cloth covering surrounding a resilient padding material such as foam rubber 21 which in turn conforms to the front outline of a solid block member 22 conveniently made of wood, metal, plastic or other suitable rigid material. A vertically extending metal clamp member 23 is shown hinged at its top with respect to the block 22. A clasp or spring latch 24 is adapted to firmly grasp the clamp 23 and hold it with respect to the block with the strap or web 11 held in non-slipping engagement between these two members, or alternately when the latch is open, the whole pad may be readily removed from (or slipped over) the strap. If desired, non-slipping engagement of the strap when the clamp is locked may be assured by providing roughened or corrugated surfaces on one or both of the clamping members 22—23.

As seen in Figs. 1 and 2, at top and bottom the pad tapers inwardly toward the front, and as seen in Figs. 3 and 4 the sides of the pads taper inwardly toward the front, all in order that the pads will fit snugly up under the arms of the human being supported and still be substantially symmetrical side for side and top for bottom so that they can be put on the strap interchangeably and either way (right side up or up side down, and either at one side or the other).

In Fig. 4 I have shown an arrangement where one pair of pads 10a are arranged as to accommodate an adult and another pair of pads 10b are arranged as to accommodate a child, and at their fronts each of the pads has an eye hook 41 for securing a safety seat belt 42 so that pads in accordance with the invention not only serve their lateral support function but also serve as convenient members for retaining the ends of such safety restraining means fitting across the chest. Such safety restraining means across the chest is more effective in preventing head and chest injury than a conventional seat belt fastened across the hips, provided the accident is not so severe as to detach the entire seat from its anchorage to the vehicle. For very severe accidents the chest strap described herein is a useful supplement to a conventional seat belt anchored directly to the vehicle frame.

Figures 5, 6:
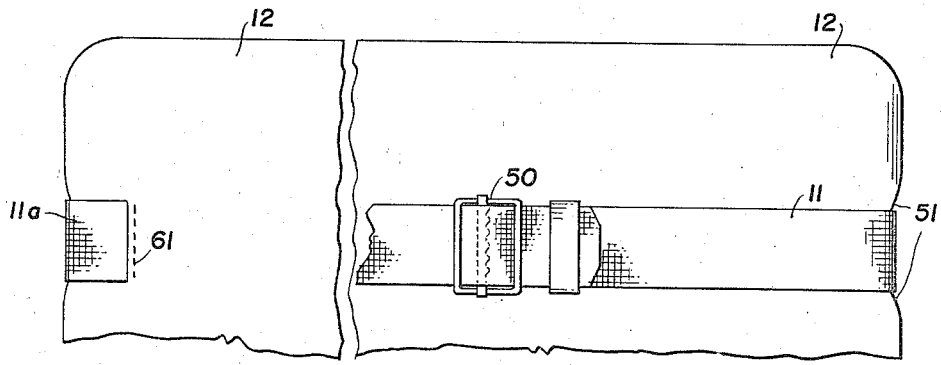
Fig. 5 is a rear view along line 5—5 of Fig. 4 to show a portion of the seat back equipped with a holeless strap buckle as may be used in connection with the arrangements of Figs. 1–4.
Fig. 6 shows a modification in which the strap means is fastened into the seat back upholstery, or seat cover.

As seen in Figs. 4 and 5 the main support strap 11 may completely encircle the seat back 12 and be fastened at the back of the seat by a conventional holeless strap type buckle 50 (so that the belt can be fastened at any point without depending upon strap perforations). Thus the strap may be pulled tight and made to indent the seat ends as at 51 to avoid vertical slippage at any predetermined vertical height of strap 11.

Another arrangement is shown in Fig. 6 in which the end of a strap 11a is sewed into the upholstery or seat cover of back 12 as by stout thread 61, and while this arrangement does not have the advantage of vertical adjustment it does provide production economies whenever apparatus according to the invention is to be provided as original equipment or as part of an accessory seat cover. Of course the strap termination and thread or other fastening need not be made at the back of the seat as shown in Fig. 6, but could be made partly at the seat ends or entirely along the front of the seat back.

Figures 7, 8:
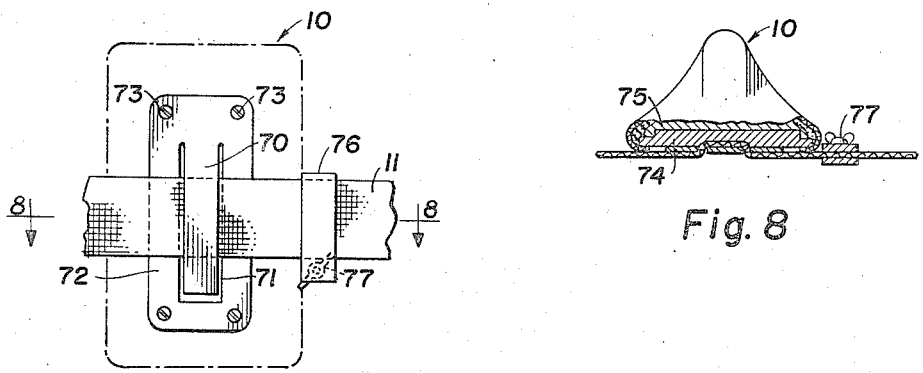
Fig. 7 is a rear view of a resilient pad having modified strap engaging and locking means.
Fig. 8 is a cross section on line 8—8 of Fig. 7.

While in connection with Figs. 2 and 3 I described a top hinged clamp 23, I have found that it is not necessary that there be an actual hinge because if the clamp 23 is somewhat resilient it may be securely fastened to the block 22 at its top and still serve its intended purpose. Alternatively, as shown in Figs. 7 and 8, the clamping member may be entirely rigid and merely be a piece cut to provide a stiff and unyielding tongue 70 with a cut out U 71 for accommodating strap 11 between tongue and a tongue support base 72 secured as by screws 73 to a metal insert 74 which in turn is secured to the internal rigid block 75. Since the strap may slip through such an engagement an additional U shaped member 76 is slipped over the strap and tightened thereupon as by a thumb screw 77 to form the clamping means. It is contemplated, of course, that the clamping means (76—77) will be located on the side of the pad 10 away from the human body.

There are thus provided arrangements of the character described capable of meeting the objects above set forth. I have found that a passenger or driver encounters little difficulty with his own hips tending to sway, but unless side restraint is provided he encounters great difficulty because his upper torso tends to swing like an upside down pendulum as the vehicle encounters curves or bumps. The simple and inexpensive means described herein corrects this condition particularly well because the apparatus is so universally adjustable to accommodate any size human with each pad fastening means just squeezing the strap and not depending upon locations of perforations therein. The pads are completely interchangeable, very easy to clamp with respect to the seat back, very easy to move or remove and to store. With the invention the driver no longer need grip the wheel so hard and the faster the vehicle goes the easier it is to turn while much less muscular effort is required by the driver to hold his own position around corners or on rough roads.

While I have illustrated and described particular embodiments various modifications may obviously be made without departing from the true spirit and scope of the invention which I intend to define in the appended claims.

I claim:

1. Lateral support for humans on flat vehicle seats comprising strap means arranged to extend laterally with respect to a vehicle seat back and to be secured with respect thereto, and a pair of independently adjustable resilient pads each having means for laterally adjustable connection to said strap means.

2. For providing removable and adjustable lateral support means for a human body with respect to a vehicle seat back, the combination of a seat back, laterally extending strap means associated with said seat back, and a pair of resilient pads slideable over the strap means, each of said pads having a bottom opening and manually operable catch means for selectively gripping the strap means at a predetermined lateral location to suit the comfort and convenience of a human body while each pad is removable upwardly with respect to the strap means as for storage of the pads.

3. For providing adjustable lateral support means for a human body with respect to a vehicle seat back, the combination of a seat back, strap and associated buckle means adapted to encircle said seat back while movable vertically with respect thereto except when buckled, and a pair of forwardly extending resilient pads each having at its back a manually operable spring release and ratchet catch means for engaging the strap means at a predetermined lateral location, whereby the pads may be adjusted both vertically and laterally with respect to the seat back to suit the comfort and convenience of a human body to support the same against lateral movement with respect to said seat back during vehicle motion.

4. In a torso supporting accessory for motor vehicle seats, strap means formed to extend laterally with respect to the back of an associated vehicle seat, a pair of padded blocks having solid block backs and resilient padding with covering tapering inwardly forwardly from the sides and from the top and bottom substantially symmetrically top and bottom and symmetrically side for side with each block back having rearwardly thereof a metal clamp member secured at one end with respect to the block back and adapted to be opened at the other end to accommodate the strap between the clamp member and the block back, and manually operable catch means at the end of said clamp member opposite the hinge end and for securing the clamp member with respect to the block back with the strap firmly grasped therebetween, whereby to provide the advantages of bucket seat backs on an ordinary straight seat back of a car, truck, bus, airplane or the like.

5. In a torso supporting accessory for motor vehicle seats, the combination as in claim 4 further characterized by a covering for an entire seat back with the strap means terminating in permanent fastenings in said covering.

References Cited in the file of this patent

UNITED STATES PATENTS

| 2,081,111 | Manley | May 18, 1937 |
| 2,664,140 | Kindelberger | Dec. 29, 1953 |
| 2,665,143 | Rasmussen | Jan. 5, 1954 |
| 2,689,604 | Hourruitiner | Sept. 21, 1954 |